G. W. CRABTREE.
TRAP.
APPLICATION FILED APR. 9, 1910.
988,863.
Patented Apr. 4, 1911.
2 SHEETS—SHEET 1.
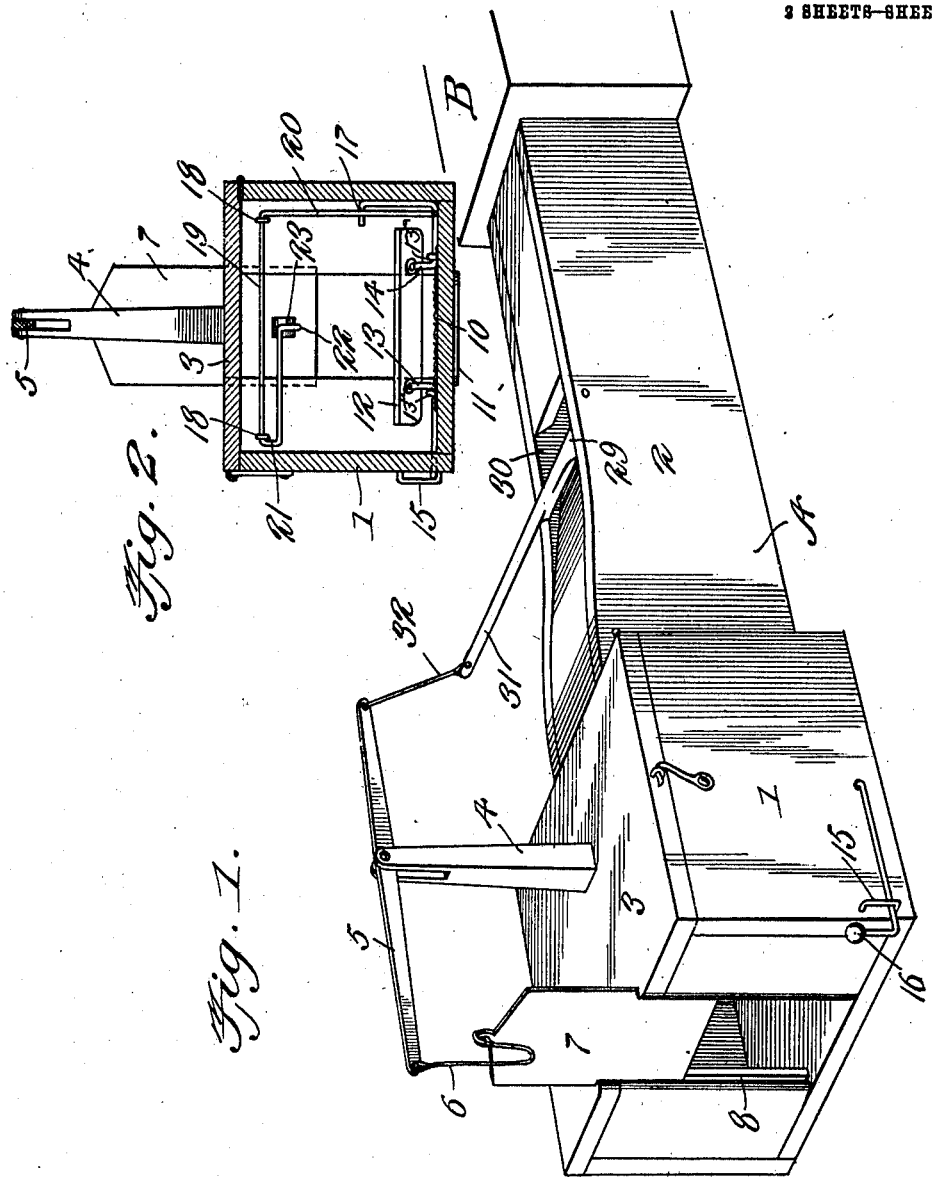
Witnesses
Frank B. Hoffman
Harry King
Inventor
George W. Crabtree
By Victor J. Evans
Attorney

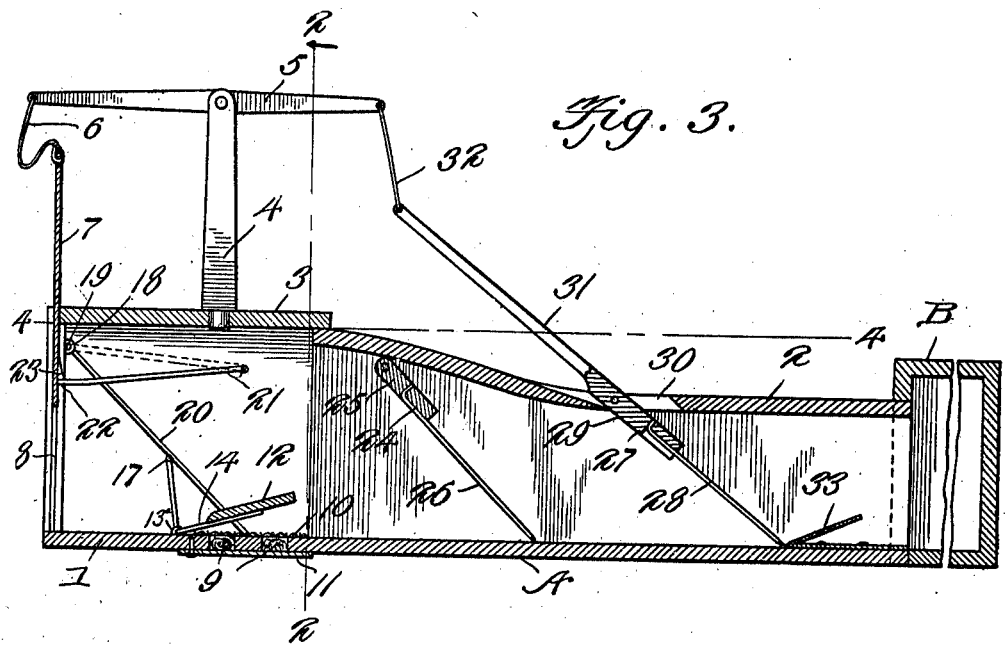

UNITED STATES PATENT OFFICE.

GEORGE W. CRABTREE, OF CENTERVILLE, TENNESSEE.

TRAP.

988,863.  Specification of Letters Patent.  Patented Apr. 4, 1911.

Application filed April 9, 1910. Serial No. 554,469.

*To all whom it may concern:*

Be it known that I, GEORGE W. CRABTREE, a citizen of the United States, residing at Centerville, in the county of Hickman and State of Tennessee, have invented new and useful Improvements in Traps, of which the following is a specification.

This invention relates to animal traps and of that type which are provided with means, whereby, the captured animal will reset the trap for the next animal.

The invention has for its principal object to provide an effective device of this character which will be comparatively cheap to manufacture, durable, and readily operated successively, by animals, fowls, rodents or the like.

Another object of the invention is the provision of a trap, provided with a vestibule having a gravity operated door and a novel trigger mechanism mounted within the same over a bait chamber and adapted to be operated by an animal entering the vestibule.

With these and other objects in view, as will appear as the description proceeds, the invention comprises the various novel features of construction and arrangement of parts which will be more fully described hereinafter and set forth with particularity in the claims appended hereto.

In the accompanying drawings:—Figure 1 is a perspective of my improved trap. Fig. 2 is a cross section taken on the line 2—2 of Fig. 3, looking in the direction of the arrow. Fig. 3 is a vertical central longitudinal sectional view of the trap the portion of the trigger which is removed being shown in dotted lines. Fig. 4 is a sectional plan view taken on the line 4—4 of Fig. 3.

Similar reference characters are employed to designate corresponding parts throughout the several views.

Referring to the drawing A designates the trap with which is used a retainer or cage B, the said trap comprising a vestibule 1 and a trunklike body portion 2 communicating therewith. The vestibule 1 is provided with a hinged cover 3, and mounted centrally thereupon is a removable upright standard 4, forked at its upper extremity to receive a horizontally disposed lever 5. Connected with the forward end of the lever 5, by a suitable connection such as a rope or chain 6, is a gravity operated door 7 which slides up and down in guides 8 formed in the vertical sides of the door opening into the front wall of the vestibule. Formed in the bottom or floor of the vestibule 1 and near the entrance to the body portion 2 is a bait chamber 9, having its upper side covered with a wire screen 10 to protect the bait while the bottom is provided with a pivoted or swinging door 11.

Situated just above the bait chamber is an inclined laterally disposed foot treadle trip 12, having forwardly and downwardly extending arms 13 and 14 terminating at the floor, where they are bent at right angles and extend laterally in opposite directions through bearings 13$^a$ secured to the floor and thence to the sides of the vestibule. The arm 13 extends through one side wall of the vestibule and then is bent at a right angle to extend forward along the outside of the said wall and through a guide 15, at which point it is bent upward and provided with a counterbalancing weight 16. The arm 14 extends upwardly and inwardly adjacent the opposite wall of the vestibule to form a trip lever 17. Mounted to rock in bearings 18 upon the rear of the front wall of the vestibule and near the top thereof is a horizontally disposed rod or shaft 19, one end of which has a rearwardly and downwardly extending arm 20 to engage the trip lever 17. The other end has an angular disposed arm 21 which extends successively rearwardly, inwardly and forwardly, the free end 22 of which is adapted to underlie a stop 23 mounted centrally upon the rear side of the gravity closed door 7, when the latter is in an elevated position.

The body portion 2, which is preferably of rectangular cross section, extends rearwardly of the vestibule a suitable distance and provides therefrom an exit to the retainer or receptacle B, which is to be placed over or against the rear of the body portion to receive the animals as they are caught.
Within the body portion 2 and just beyond the entrance thereof is a rearwardly and downwardly inclined gravity closed door 24 hinged at its upper forward end between the side walls thereof. This door is formed of a hinged member 25, having a series of spaced downwardly projecting rods 26 which have sharpened ends that normally rest upon the floor. Arranged within the said body portion and in rear of the door 24 is a similar inclined door 27 pivoted between the side walls and at the top of the body portion. The lower part of this door is composed of a series of spaced rods 28, sharpened at their ends or lower extremities, which rods are fixed to a hinged member 29, the same extending upwardly and forwardly through an opening 30 formed in the top of the body portion. The forward portion of this hinged member is reduced and formed into an arm 31, the end of which is connected by a suitable means, such as a rope or chain, 32 with the free end of the rocking lever 5. In the rear of the inclined door 27 and adjacent the ends of the spaced rods 28 is an angular, laterally extending guard plate 33 secured to the floor and adapted to prevent the animal after he has passed the door, from raising the same in any manner.

From the foregoing, it will be obvious that an animal entering the vestibule of the trap in search of the bait will step upon the treadle therein, causing the trigger mechanism to operate and thereby release the gravity door of the vestibule, thus preventing the escape of the animal. The animal, however, in an endeavor to escape will then pass into the body portion of the trap, raise the gravity door 24 by the pressure of his body, then pass onward to the resetting gravity door 27 which will also be raised by the pressure of his body against the same thus causing the lever 5 to rock on its pivot to elevate the front door of the vestibule. As soon as the said door is raised to the proper height, the free end 22 of the arm 20 will move into engagement with the shoulder stop 23 and thus hold the door in an elevated or set position ready to entrap the next animal. After the animal has passed the last door in the body portion of the trap and reset the aforementioned door, he will then pass on into the receiving receptacle or retainer where he will remain until it is found desirable to remove the receptacle. It is to be understood that the receiver B is detachably connected to the rear end of the trap so that the animals caught therein can be readily transported to a convenient place and disposed of as desired.

What I claim is:—

1. In a trap comprising a vestibule, a body portion communicating therewith; a sliding door for the vestibule; a movable treadle arranged in the vestibule, a trip arm carried by the treadle; a trigger pivotally mounted within the vestibule above the door and including a substantially rectangular portion, the free end of which underlies the pivoted portion thereof to engage and normally sustain the door in open position, and a rearwardly extending arm disposed in the path of movement of the said trip lever; gravity doors mounted in the body portion of the trap; and resetting mechanism between the first and one of the last mentioned doors.

2. In a trap comprising an inclosure having a movable door at one end; a movable treadle located immediately at the rear of the door, means normally holding the treadle in operative position, a trip arm carried by the treadle; a pivotally mounted trigger constructed to form a substantially rectangular portion including a retaining member removably engaging the door and constructed also to form a counter-balancing portion operating to hold the door in an open position, and an arm formed on the said trigger and disposed in the path of movement of the said trip arm to be engaged thereby to release the retaining member of the trigger from the door when the treadle is depressed; movable doors mounted in the closure at the rear of the said first named door; and setting mechanism between the first named door and one of the said second named doors operating to return the first named door to its open position after operation of the treadle.

In testimony whereof I affix my signature in presence of two witnesses.

GEORGE W. CRABTREE.

Witnesses:
JASPER H. BATES,
ARTHUR J. FAWLKES.

---

Copies of this patent may be obtained for five cents each, by addressing the "Commissioner of Patents, Washington, D. C."